(No Model.)
G. LAGELOUZE.
BAKE PAN.
No. 573,986. Patented Dec. 29, 1896.
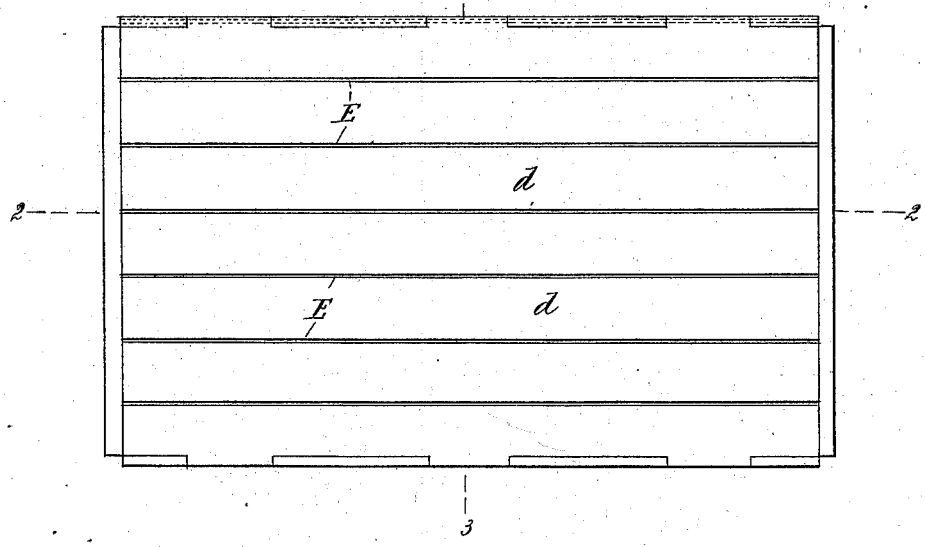
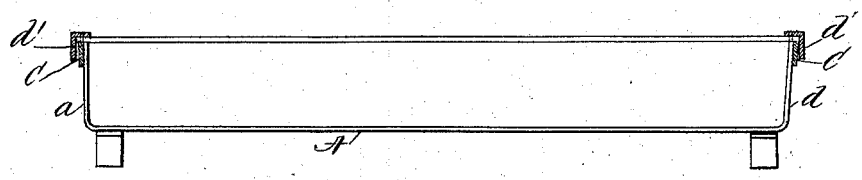
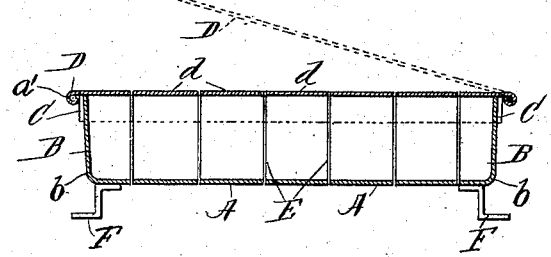
WITNESSES:
John Buckler,
C. Gerst
INVENTOR
Gaston Lagelouze
BY Edgar Tate & Co
ATTORNEYS.

UNITED STATES PATENT OFFICE.

GASTON LAGELOUZE, OF NEW YORK, N. Y., ASSIGNOR OF ONE-HALF TO REMY FABIEN, OF SAME PLACE.

BAKE-PAN.

SPECIFICATION forming part of Letters Patent No. 573,986, dated December 29, 1896.

Application filed September 28, 1895. Serial No. 563,989. (No model.)

*To all whom it may concern:*

Be it known that I, GASTON LAGELOUZE, a citizen of France, and a resident of New York, county of New York, and State of New York, have invented certain new and useful Improvements in Bake-Pans, of which the following is a specification, reference being had to the accompanying drawings, forming part thereof, in which similar letters of reference indicate corresponding parts.

This invention relates to improvements in bake-pans; and the object thereof is to provide an improved device of this character by means of which the surplus moisture in the dough and the carbonic-acid gas formed in the process of baking are permitted to escape or are expelled, and the bread produced is hard and crisp and nutritious and more assimilable; and with this and other objects in view the invention consists in the construction and arrangement of parts hereinafter more fully described in the specification.

The invention is fully disclosed in the following specification, of which the accompanying drawings form a part, in which—

Figure 1 is a plan view of a bake pan or mold which I employ, Fig. 2 a longitudinal section thereof on the line 2 2, and Fig. 3 a transverse section on the line 3 3.

My improved bake pan or mold is composed, preferably, of metal strips or plates A, which form the bottom and ends thereof by bending up the ends, as shown at $a$, and the side strips or plates B, which are bent longitudinally to form bottom flanges $b$, which, together with the strips or plates A, form the bottom of the pan, or the sides B and the parts or flanges $b$ may be formed separately, if desired.

The bottom strips or plates A and the side strips or plates B, after being bent to form the pan or mold, are united at the top by a metal band C, to which each is secured, and the top or cover D, which is preferably hinged thereto, is also composed of metal strips or plates $d$, which are united by end pieces $d'$ or in any desired manner, and the cover or top is also preferably provided with a depending flange or rim $a'$, which surrounds the top of the pan and fits closely thereto, and the strips or plates which form the body of the pan and the cover thereof are placed at a line's distance from each other, the object of which will hereinafter appear, and the mold or pan is provided with feet or supports F to allow the heat to freely circulate around the same.

As is well known, the inside or spongy body of bread is the part thereof which is composed mostly of water and is heavy and difficult to digest, while the crust or outer portion is almost if not entirely waterless and contains most of the gluten and other nutritious substances, such as are soluble in and assimilable by the fluids of the stomach, and by my improved process the high degree of heat to which the bread is subjected in the process of baking the same destroys all germs of corruption, and a perfectly preservable product is the result. In order to accomplish the result, I endeavor to obtain a crust which is thick and smooth and without holes or cracks which permit the introduction of dust or other objectionable substances which aid decomposition, and while being sufficiently porous to absorb liquids it is never friable or brittle and will stand packing and transportation to distant points or long voyages.

The dough having been properly mixed and allowed to partially raise, it is divided and put into the specially-constructed molds or pans, hereinbefore described, and said molds may be of any desired size and form. Each portion of the dough is carefully weighed, the weight being in proportion to the capacity of the mold, but its volume being inferior to that of the latter. When the dough in the open mold has spread sufficiently and raised so as to entirely fill the same and to take its exact shape, the cover is secured thereon or closed down and locked, and the mold is put in the oven.

In practice the oven is heated to a high degree, when the alcohol and the gases of the dough continue their work, but the raising of the dough is checked by the mold, while the alcohol is converted into a steam, and the gases otherwise formed find a natural escape through the intervals between the strips or plates which form the mold. The dough is thus more and more compressed, when, after having been sufficiently heated, so as to obtain, as already stated, both the destruction of the noxious germs of the flour and the solubility of the gluten, the bread has a crust such as hereinbefore stated, and there remains nothing to be done but to take it out of the oven and to cool and to dry it with the required precaution.

Having fully described my invention, I claim and desire to secure by Letters Patent—

A mold or pan for baking bread, substantially as herein shown and described, consisting of a bottom portion which is formed of narrow strips arranged parallel with each other with a narrow strip between the meeting edges adjacent each space thereof, the end of said strip being bent upwardly to form the side of the pan, and a cover also formed of narrow strips between the adjacent edges of which are narrow spaces, said cover being hinged to one side of said pan, and provided with a sliding device upon the outer side thereof, said pan being provided with legs or supports secured at corners thereof, the top of the bottom strip or plates and the side strips or plates are united by a band C, whereby when the dough begins to rise the cover is closed and locked, and the liquid matter contained in the dough is forced through the slots between the adjacent edges of the strips by the compression of the dough, as and for the purpose specified.

In testimony that I claim the foregoing as my invention I have signed my name, in presence of the subscribing witnesses, this 27th day of September, 1895.

GASTON LAGELOUZE.

Witnesses:
C. GERST,
A. C. McLOUGHLIN.